Patented June 5, 1945

2,377,547

UNITED STATES PATENT OFFICE 2,377,547

WATER SOLUBLE ALUMINA HYDRATE POWDER

Walter M. Fuchs, New York, N. Y.

No Drawing. Application April 5, 1943,
Serial No. 481,882

1 Claim. (Cl. 23—143)

This invention relates to the manufacture of a water soluble alumina hydrate powder.

It is an object of this invention to provide alumina monohydrate in form of hard lumps as a starting material in the production of water dispersible alumina hydrate in solid, powdered form.

It is another object of this invention to peptize alumina monohydrate.

It is another object of this invention to dehydrate peptized alumina hydrate to such extent as to render a solid powder, dry to the touch, yet easily dispersible in water.

Other objects of the invention will appear from the following description.

At present, alumina compounds have important applications in impregnating textile fibers, in dyeing with mordant dyes, and in water purification, all these uses being based on the intermediate formation of aluminum hydroxide. Aluminum oxide films are important in coating and finishing aluminum surfaces; such films are at present formed in situ, and are significant in the construction of rectifiers, condensers, and lightning arresters. The use of aluminum hydroxide gels in the production of pharmaceutics, cosmetics, and various technical emulsions has been described by Dickeson in Brit. Pat. 487,855 (1938). However, gels have the disadvantage of variable water content and are subject to aging.

In the present invention, a solid, stable alumina hydrate powder which is dispersible in water is prepared by manufacture in three distinct steps, namely, (1) preparation of a special alumina monohydrate, (2) peptization of said monohydrate, and (3) dehydration of the peptized hydrate.

(1) It has been found in this invention that alumina monohydrate in form of hard, faintly lustrous lumps offers a specific starting material for the production of the water dispersible alumina hydrate powder. Alumina hydrate in form of characteristic, splintering lumps has been described first in my work with Verbeck, Ind. & Eng. Chemistry 27 (1935), pp. 410–413.

This publication describes the production of a hardened, faintly lustrous solid aluminum hydroxide by quickly precipitating aluminum hydroxide from a water solution of an aluminum compound at temperatures between 50° C. and 90° C. and carefully drying to give the solid product, which has the further identifying characteristic of splintering into smooth, lustrous grains when contacted with water.

Subsequently, unpublished research work has shown that the product of Fuchs and Verbeck is a monohydrate, and probably boehmite. In order to transform the more common types of aluminum hydroxide, e. g., the moist commercial product of the Baeyer process, into the desired lumps of monohydrate, it is necessary to accomplish a reduction of the original water content in an atmosphere of water or steam. This can be done, e. g., by following the procedure developed by Fleissner, U. S. Pat. 1,632,829 (1927), for the drying of low-grade colloidal fuels (brown coals and lignites) to coherent lumps which stand handling. The fuel as mined has about 50% moisture, and upon drying tends to give a dusty, powdery product. In the Fleissner process, the coal is first treated with superheated steam for about one hour, and thus made to shrink to a capillary structure with strengthened walls; thereafter, the steam pressure is progressively reduced in order to start the drying, and the reduction of pressure is continued until the product is dry. This process is applicable to commercial precipitated alumina hydrates.

(2) It has been established that the monohydrate lumps in contrast to other forms of alumina hydrates can be peptized by an especially simple and convenient procedure. If the monohydrate lumps are covered with, or introduced into dilute hydrochloric acid, they first decompose mechanically into splinters, and then transform gradually into a viscous, transparent gel. After completion of the transformation, the supernatant liquid may be poured off, and the product is ready for the final step of manufacture.

(3) Dehydration of the peptized monohydrate is effected at low temperature and pressure by the use of proper drying equipment; the drying may be advantageously preceded by washing the gel with, e. g., ethyl alcohol. The dehydrated product is a powder, dry to the touch and easily dispersible in water. The aqueous dispersions show only a slight opalescence; they can be used in impregnating, dyeing, water purification, in the conditioning of surfaces, in the preparation of emulsions, and for various other purposes.

I claim:

A process for producing a water dispersible aluminum hydroxide which comprises first quickly precipitating aluminum hydroxide from a solution of a water soluble aluminum compound in an alkaline pH range at a temperature between 50° C. and 90° C., washing said precipitate free of non-aluminous compounds, drying the washed precipitate until a hardened faintly lustrous solid is obtained which in contact with water cracks to splinters, peptizing said hardened splintering faintly lustrous solid with hydrochloric acid, and dehydrating the peptized material.

WALTER M. FUCHS.